(No Model.)

H. H. TAPPER.
GRASS RECEIVER FOR LAWN MOWERS.

No. 363,093. Patented May 17, 1887.

WITNESSES:
Ira R. Foy
Wm. J. Jingle

INVENTOR
Henry H. Tapper
BY
L. H. Kulp
ATTORNEY

UNITED STATES PATENT OFFICE.

HENRY H. TAPPER, OF LANCASTER, PENNSYLVANIA.

GRASS-RECEIVER FOR LAWN-MOWERS.

SPECIFICATION forming part of Letters Patent No. 363,093, dated May 17, 1887.

Application filed June 22, 1886. Serial No. 205,944. (No model.)

*To all whom it may concern:*

Be it known that I, HENRY H. TAPPER, a citizen of the United States, residing at Lancaster, in the county of Lancaster and State of Pennsylvania, have invented certain new and useful Improvements in Grass-Receivers for Lawn-Mowers; and I do hereby declare the following to be a full, clear, and exact description of the invention, such as will enable others skilled in the art to which it appertains to make and use the same.

This invention relates to an improved device to be attached to lawn-mowers, which will be a receiver for the grass after being cut by the machine, thus preventing the same from being scattered over the lawn, said receiver to be emptied by the operator when filled, in the manner hereinafter described.

The invention consists of a rectangular scoop-shaped device, the front end where attached to the machine being open, and the rear end hinged so as to be lowered at will; also, partly in the manner of attaching the same to the mechanism of the mower. This operation and the general arrangement of the several combined parts will be readily understood from the following specification and accompanying drawings, similar letters referring to similar parts throughout the several views.

Figure 1:
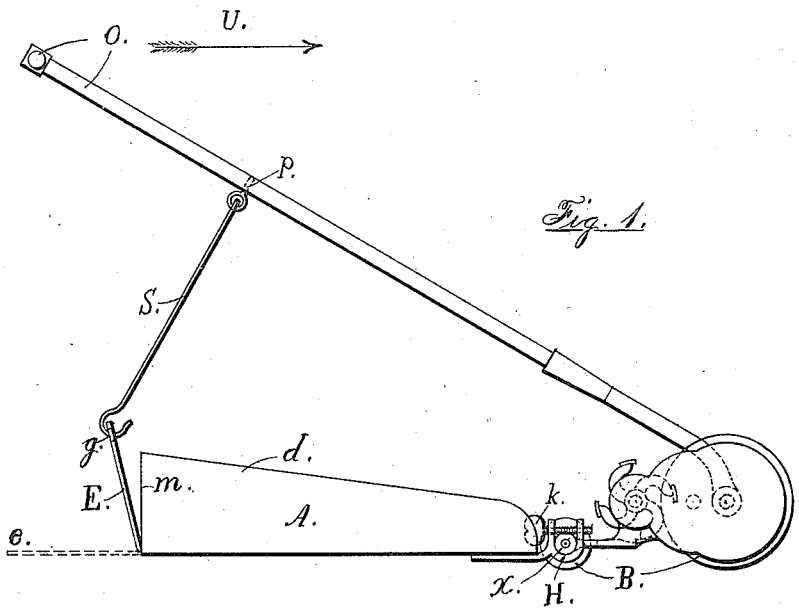
Figure 2:
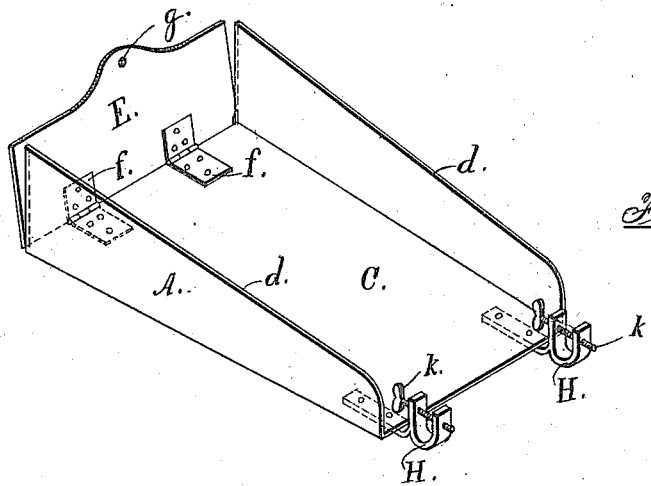

Figure 1 is a side elevation showing the receiver A attached to the mower B; Fig. 2, an isometrical perspective view of this device detached from the mower.

In Fig. 2 the bottom $c$ of the receiver A has the two sides $d$ bent up at right angles and fast to the bottom $c$. At the rear end is hinged the tail-board E by means of the hinges $f$. This tail-board has an eye or hole, $g$, in the center at its top, for a purpose hereinafter described, and fast to the bottom $c$. At the front part are two journal-sockets, H, with thumb-screws $k$ through the upper part of the jaws of the same.

The manner of attaching this receiver to the mower B will be seen in Fig. 1, the thumb-screws $k$ being removed from the jaws of the journal-sockets H. These sockets are slipped up from below onto the ends of the journal X of the roller attached to the mower B. While in this position the front edge of the bottom $c$ of the receiver A should be about one inch from the roller of the mower B. The thumb-screws $k$, being fastened in the jaws and passing over the top of the journal X, hold the receiver A fast to the same, yet allow the rear end, $m$, of the receiver A to be raised and lowered at will.

Fast in the mower-handle $o$ is the screw-eye P, in which swivels the hook S. The hook S engaging in the hole $g$ in the center of the tail-board E, keeps it up and against the end of the sides $d$ at $m$.

Having thus described this device, the manner of working it is as follows: The receiver A being attached to the mower B, as at Fig. 1, and the hook S engaged in the hole $g$ of the tail-board E, the operator, holding up the handle $o$ of the mower B, keeps the tail-board E against the sides $d$, at $m$, by means of the hook S pushing against the handle $o$ in the direction of the arrow U, the mower drawing after it the receiver A. As the material to be mowed is cut it is all deposited in the receiver A between the sides $d$ and against the inner side of the tail-board E. When the receiver A becomes filled with the waste from the mower, the hook S is disengaged from the hole $g$, and the tail-board E falls flat in the position of the dotted lines $e$, and the waste is drawn out of the receiver A over the tail-board E by the operator with any suitable device. I prefer to attach the receiver A to the mower B in the manner described; but any modification of this attaching arrangement on my construction of receiver necessary to meet the requirements of different styles of mower would be considered essentially the same.

Having thus described my invention, what I claim as new, and desire to secure by Letters Patent, is—

1. The receiver A, consisting of the sides $d$, hinged tail-board E, and bottom $c$, as herein set forth, in combination with the hook S and the handle $o$ of the mower, to which said hook is attached by the eye P and adapted to engage with and support the tail-board E, substantially as set forth and described.

2. The receiver A, consisting of the sides $d$, hinged tail-board E, and bottom $c$, as herein set forth, in combination with the hook S and handle o, to which said hook is attached by the eye P and adapted to engage with and support the tail-board E, as set forth, and the journal-sockets H, thumb-screws k, and roller-journal X of the mower B, said sockets H being rigidly attached to the forward end of the receiver A and adapted to engage with and be held in position on said journal X by the thumb-screws k, substantially as herein shown and described.

In testimony whereof I affix my signature in presence of two witnesses.

HENRY H. TAPPER.

Witnesses:
    D. H. KULP,
    WM J. MINGLE.